United States Patent

[11] 3,614,579

| [72] | Inventor | Langdon Hollister Fulton<br>Wynnewood, Pa. |
|---|---|---|
| [21] | Appl. No. | 75,012 |
| [22] | Filed | Sept. 24, 1970 |
| [45] | Patented | Oct. 19, 1971 |
| [73] | Assignee | RCA |

[54] SQUEEZE FILM BEARING SERVOSYSTEM
7 Claims, 4 Drawing Figs.

[52] U.S. Cl. ................................................ 318/676,
324/61 R, 340/174.1 E
[51] Int. Cl. ........................................................ G05b 11/01
[50] Field of Search ........................................ 318/662,
677; 324/34 TA, 61 R; 340/174.1 E; 179/100.2 P

[56] References Cited
UNITED STATES PATENTS
2,630,559  3/1953  Whittier ........................ 318/662 X
3,201,526  8/1965  Wessels et al................. 179/100.2
3,290,666  12/1966  Crew............................. 179/100.2

Primary Examiner—Benjamin Dobeck
Attorney—H. Christoffersen

ABSTRACT: A signal transducer which is urged toward a recording medium surface is prevented from contacting the surface by an oscillatory transducer. The oscillatory transducer, which is direct motion coupled to and alternating motion isolated from the signal transducer, is positioned adjacent the recording medium surface and caused to oscillate in a direction transverse to the surface, which creates a pressurized air film to hold the transducers away from the recording medium surface. The amplitude at which the oscillatory transducer is driven, which may be controlled by a servosystem, determines the distance of the signal transducer from the recording medium surface.

SQUEEZE FILM BEARING SERVOSYSTEM

BACKGROUND OF THE INVENTION

In apparatus where two elements move relative to one another with their surfaces in proximity, some means must be provided to prevent wear due to sliding friction. Further, it may be desired to maintain a fixed spacing between the two surfaces.

One example of such apparatus is a magnetic disc or drum storage unit used in conjunction with a digital computer to store information. In such apparatus, the signal transducer or transducers used to read information from and record information onto the rotating drum or disc recording medium must be kept a close and relatively fixed distance from the recording medium surface. The most common method of achieving such a result is by providing a pressurized gas film bearing between the recording medium and signal transducer surfaces.

This has been accomplished in the prior art by one of two methods. The first, called the hydrostatic bearing, is accomplished by forcing a pressurized gas, usually air, through openings in the planar surface in the transducer opposite the disc. In addition to problems associated with the pumps and other fluid-conducting apparatus necessary to provide pressurized air at the bearing surface encompassing or adjacent to the transducer, great difficulty is encountered in providing a uniform condition of air flow within the bounds of the air film, such as to permit regulation of the spacing between transducer and recording medium surface.

A second and more common method, providing a hydrodynamic bearing, is accomplished by shaping the transducer and/or its surrounding structure, in such a way that it will "fly" over the rapidly moving recording medium surface. This method eliminates the need for an external source of pressurized air such as is needed for the hydrostatic bearing, but does require relatively high speed movement between the transducer and recording medium to produce the requisite air pressure. Further, the transducer to recording medium surface spacing is dependent upon the relative surface velocity between the transducer and the recording medium, as well as certain other "fixed" parameters. The functional state of the gas bearing may not be varied over short time intervals to permit regulation or control of the gas film thickness, that is, to control the spacing between the transducer and recording medium surface. Furthermore, in the case of a disc-configured recording medium, the transducer must "track" over a range of differing radii from the center of rotation of the disc. This, in turn, causes a corresponding range of linear velocities to be seen by the bearing "pad," thus precluding even the maintenance of average, or long time, constant conditions of bearing operation and constant transducer standoff distance.

The object of the present invention is to provide yet a third type of gas bearing apparatus which may be employed to provide close and rapid regulation and control of transducer standoff spacing and does not suffer from the deficiencies of the prior art.

SUMMARY OF THE INVENTION

An element which is positioned adjacent a reference surface, in the environment of an air or other gaseous atmosphere, is maintained a fixed distance from the surface by a transducer means adjacent the surface which is caused to physically oscillate in a direction transverse to the surface to thereby create a squeezed gas film. A means for producing an error signal indicative of the mean departure of the element from the desired distance from the surface is coupled to the transducer to enable regulation of its amplitude of oscillation and thereby the mean thickness of gas film, to maintain the desired spacing. The transducer is coupled to the element by means which isolate the two with respect to oscillatory movement.

BRIEF DESCRIPTION OF THE DRAWING

FIG. 3 is an alternate oscillatory transducer means to that shown in FIG. 2.

DETAILED DESCRIPTION

Figure 1:
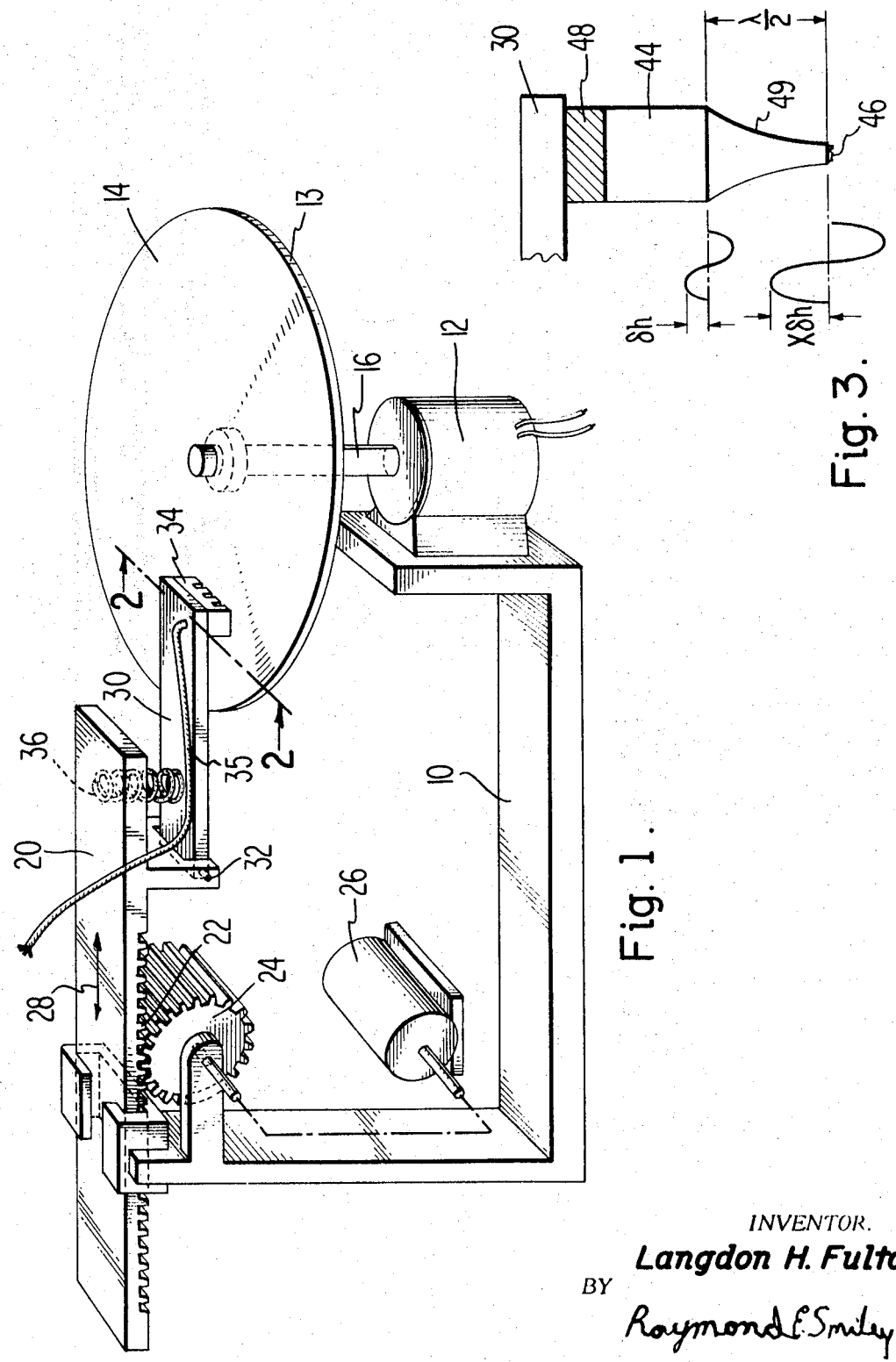
FIG. 1 is a magnetic disc memory system employing the present invention.

In the magnetic disc memory system of FIG. 1, a frame 10 supports a disc drive motor 12. A disc pack 13, shown with only one disc but which may comprise several discs stacked one atop another, is removably secured to shaft 16 of motor 12 to be rotated thereby at relatively high speeds. Disc 13 is commonly made of a nonmagnetic metal or nonmetal substrate on which is placed a film of magnetic recording medium material 14.

An arm 20 is slidably attached to frame 10. A toothed portion 22 of arm 20 is arranged to cooperate with a gear 24 also rotatably attached to frame 10. A servomotor 26 is mechanically coupled to gear 24 to thereby cause motion of arm 20 relative to frame 10 in the direction of arrow 28 in response to signals from a signal source (not shown). Cantilever arm 30 is attached to arm 20 by a hinge 32. Secured to the end of cantilever arm 30 opposite hinge 32 is a transducer assembly 34. A biasing element such as a spring 36 provides a constant force to urge transducer assembly 34 toward recording medium 14. While biasing means 36 is illustrated as a compression spring, it may alternately be a torsional spring, a gas bellows or may in fact be the force of gravity acting on cantilever arm 30.

Information is recorded on recording medium 14 in concentric circular tracks. When it is desired to read information from or write information onto the recording medium, servo motor 26 operates to thereby position transducer assembly 34 over the desired data track. Then electrical signals are sent to and from transducer assembly 34 via cable 35.

Figure 2:
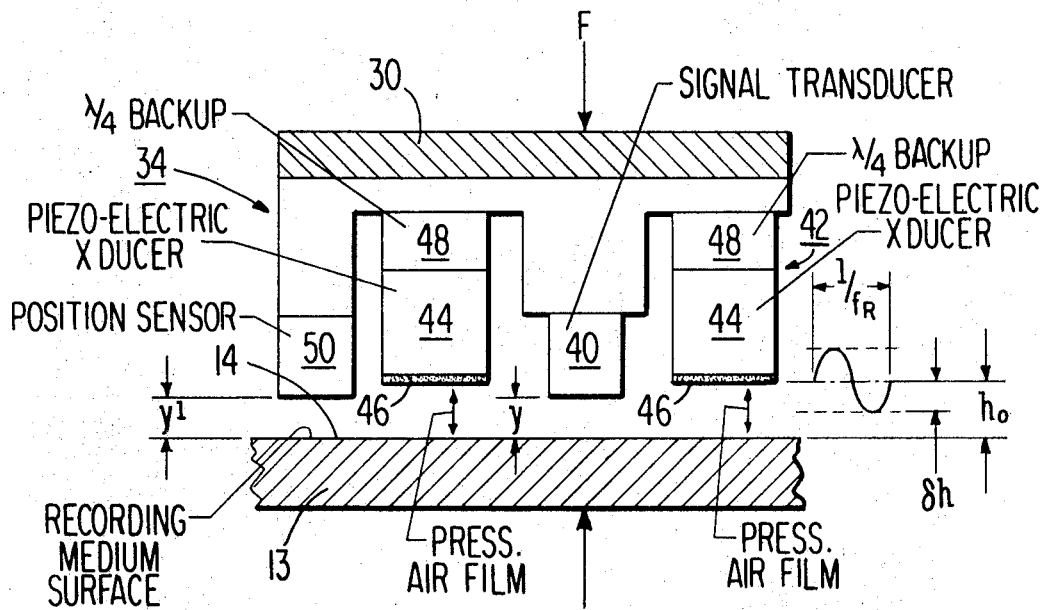
FIG. 2 is a cross section of FIG. 1 along line 2—2 and illustrates in greater detail the transducer assembly used in the system of FIG. 1.

Referring to FIG. 2, which shows the transducer assembly in greater detail, a signal transducer 40 is mounted in the approximate transverse center of cantilever arm 30. One or more oscillatory transducer means such as assemblies 42, two of which are shown, are also mounted to the cantilever arm 30. Alternately, a single circular transducer assembly 42 may surround the signal transducer 40. Each transducer assembly may consist of a half wavelength (long) piezoceramic transducer element 44 with a thin smooth-faced metal membrane 46 attached to the surface of element 44 adjacent recording medium 14 and a one-quarter wavelength metal acoustical isolation of "backup" element 48 attached between the opposite surface of element 48 and the cantilever arm 30. (In both cases the wavelengths referred to are at the resonant frequency $f_r$ of the piezoelectric transducers.) The purpose of the backup element 48 is to provide a nonloading rigid mount for the transducer while simultaneously isolating the mechanical vibrations of the oscillatory transducer from the cantilever arm 30 and signal transducer 40.

An alternate to transducer means 42 is illustrated in FIG. 3. Here a $\lambda/2$ exponentially tapered acoustical means such as horn 49 is positioned between transducing element 44 and membrane 46. As is known to those skilled in the art, a horn of any multiple of length $\lambda/2$ will also function properly. It will be noted from FIG. 3 that with an excursion of the piezoceramic element $\delta h$, the excursion of membrane 46 will be $X\delta h$ where X is the ratio of the cross-sectional area of the horn at the piezoelectric element end to that at the membrane end. The desirability of this additional excursion will be brought out shortly.

A distance measuring means 50, such as a capacitive or inductive position sensor, is also attached to arm 30 to measure the distance between the position sensor and recording medium surface, for reasons which will be explained later. In a capacitive system, the capacitance between element 50 and recording surface is measured and is a function of the distance between element 50 and surface 14. This is converted by element 50 into a voltage proportional to capacitance and therefore spacing.

Figure 4:
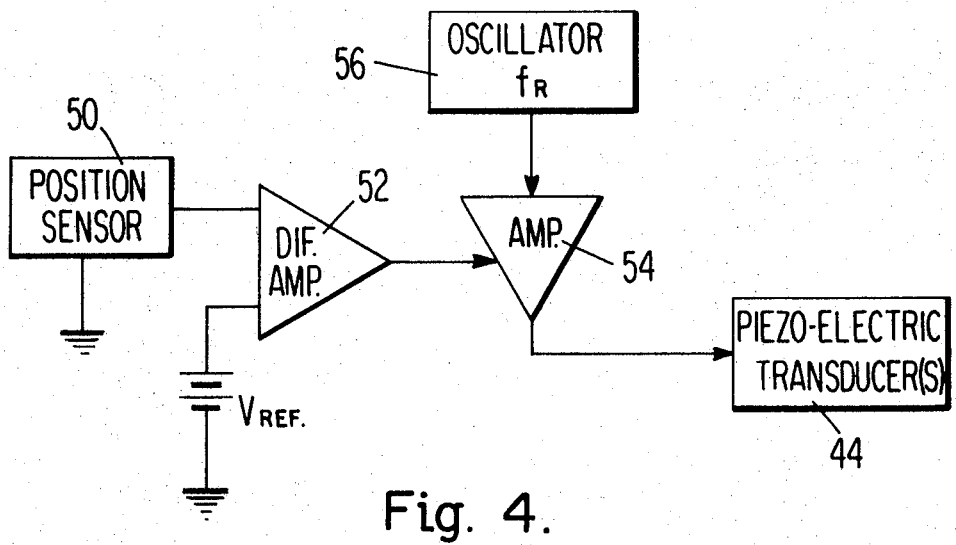
FIG. 4 is a block diagram of a feedback control system for spacing the transducer assembly from the recording medium in the disc system of FIG. 1.

The piezoelectric transducer 44 is driven at its fundamental resonant frequency, for the elected mode, $f_r$ by a suitable power oscillator 56 (FIG. 4). This results in a corresponding periodic sinusoidal extension of membrane surface 46 of magnitude $\delta h$. The sinusoidal motion of the membrane in a direction essentially normal to recording medium 14 creates a pressurized gas film between the oscillatory transducer assembly 42 and recording medium 14. The gas may be any compressible gas but will most commonly be air. This phenomenon, referred to in the literature as a squeeze film, results in a gas pressure equilibrium being reached between a constant force F caused by biasing means 36 (FIG. 1) urging the transducer assembly 34 toward the recording medium and a counterdirected force of the film pressure. A mean gas film thickness, distance $h_o$, FIG. 2, is thereby achieved between membrane surface (unextended) and recording medium surface. The magnitude of $h_o$ is typically 10 percent to 25 percent greater than the magnitude of $\delta h$.

The displacement $h_o$ bears a fixed relationship with respect to $y$, the distance between signal transducer 40 and recording medium 14. It is generally desirable in magnetic recording apparatus to maintain the distance $y$ a constant at all times during operation regardless of perturbations such as rotational runout of the recording medium disc 13, flatness variations in the surface 14, etc., which factors tend to cause a transient variation in $y$. From squeeze film bearing technology it is known that at equilibrium, F becomes the force loading of the gas bearing, and is proportional to $\delta h/h_o$. Therefore if $\delta h$ is varied, $h_o$ varies correspondingly so as to sustain the bearing loading equilibrium state. Since any change in $h_o$ results in an equal change in $y$, a change in $\delta h$ results in a corresponding change in $y$. Experience with piezoceramic transducer as driving means for squeeze film bearings has demonstrated that at transducer resonance, the magnitude of the electrical drive current to the transducer is almost directly proportional to the transducer excursion amplitude $\delta h$. Further, the excursion amplitude is proportional to the thickness of gas film $h_o$, thereby created.

In some systems it may not be possible to obtain a sufficiently large $\delta h$ to obtain the desired $h_o$. In these cases, the arrangement of FIG. 3 is particularly useful. This principle permits a servosystem arrangement, FIG. 4, to maintain a constant distance $y$ between signal transducer 40 and the recording medium 14.

Referring to FIG. 4, position sensor 50 constantly monitors the distance, $y'$, between itself and recording medium 14 and therefore, in effect, monitors the distance $y$ between signal transducer 40 and recording medium 14. The output of position sensor 50 is coupled as one input to differential amplifier 52. The second input $V_{ref}$ is a voltage corresponding to the desired spacing from the position sensor to the recording medium. Although shown as a battery, $V_{ref}$ may be fixed or adjustable direct voltage. The output of amplifier 52 is coupled to current amplifier 54 as is the output of oscillator 56. The oscillator, which may be a crystal oscillator, is adapted to drive the amplifier at the fundamental resonance frequency $f_r$ of the piezoelectric transducer. The voltage output of differential amplifier 52, representing the difference between the actual position and desired position of the signal transducer, controls the gain and therefore magnitude of current from amplifier 54 as input to the piezoelectric transducers 44.

In the prior art disc systems using hydrodynamic bearing principles to "fly" the signal transducer over the recording medium surface, the surface 14 speed varies with the distance from the central axis of the disc. Since the height that the signal transducer flies above the disc surface depends on the speed of the disc, the height is dependent on the distance of the transducer from the center of the disc. Further, if for any reason the disc slows down any appreciable amount, the head being urged toward the disc surface tends to "crash" onto the surface damaging one or both of the transducer and the recording medium surface. By contrast, the signal transducer in the present invention always remains at a constant height $y$ above the recording medium surface and is not dependent on the position of the transducer relative to the center of the disc nor at the speed with which the disc is rotating.

While the invention has been described in the context of a disc drive system, it will be understood that the signal transducer and recording medium surface may in fact by any two elements which it is desired to space a given distance apart. It is to be further understood that even in a magnetic recording system where it may not be necessary to maintain an exact spacing between the signal transducer and recording medium surface, the servosystem may be eliminated using a fixed signal current drive level into the piezoelectric transducer to produce within reasonable tolerances a constant average spacing of signal transducer to recording medium surface.

What is claimed is:

1. Apparatus for maintaining a desired spacing between opposing surfaces of two elements which are urged toward each other comprising, in combination:

distance-measuring means for producing signals indicative of the actual spacing between said surfaces;

means coupled to said distance-measuring means for producing signals indicative of the error between the desired spacing and actual spacing; and transducer means direct motion coupled and alternating motion isolated from one of said elements and having a surface opposed to said other element surface responsive to said error indicative signal for producing physical oscillatory motion in a direction normal to the two element surfaces and varying in amplitude in accordance with the value of the signal applied thereto to provide a pressurized gas film between said transducer means and said other element surface whereby said desired spacing is maintained.

2. The combination in accordance with claim 1, wherein said transducer means comprises a piezoelectric crystal adapted to be oscillated in response to a source of alternating current the magnitude of said oscillations being proportional to the magnitude of said current.

3. The combination in accordance with claim 1, wherein said transducer means comprises a piezoelectric transducer adapted to oscillate at a given magnitude coupled to one end of an exponentially tapered acoustical transmission means the other end of which is adjacent said other element for amplifying the magnitude of said oscillations.

4. Apparatus for spacing a recording medium surface from a signal transducer positioned in operative relation therewith the two elements being urged toward one another comprising, in combination:

transducer means direct motion coupled to and alternating motion isolated from said signal transducer and in proximity to said recording medium surface for producing oscillatory motions in a direction normal to the surface of the recording medium to create a pressurized gas film between said transducer means and said recording medium to thereby keep said signal transducer spaced from said recording medium.

5. Apparatus for spacing at a desired amount a signal transducer from a recording medium adjacent thereto toward which it is urged comprising, in combination:

means for causing relative motion of said recording medium and signal transducer in a direction which does not substantially vary the spacing between the two;

means providing signals indicative of the actual spacing between the recording medium and signal transducer;

means responsive to said signals for producing error signals indicative of the difference between said actual spacing and desired spacing between said recording medium and signal transducer; and oscillatory transducer means direct motion coupled to and alternating motion isolated from said signal transducer and having a surface opposing said recording medium surface for producing oscillatory vibrations in a direction transverse to the surface of said recording medium at amplitudes which correspond to said error signal, said oscillatory motions thereby causing a pressurized gas film of thickness corresponding to the amplitude of said oscillations to keep said oscillatory transducer and said signal transducer a desired distance away from contact with said recording medium.

6. In combination:

a reference surface;

an element positioned adjacent to said surface which it is desired to maintain a desired fixed distance from said surface;

means for producing an error signal indicative of the departure of said element from said desired distance from said surface;

transducer means adjacent to said surface responsive to said error signal for physically oscillating toward and away from said surface at an amplitude proportional to a parameter of said signal for thereby creating a squeeze gas film between said transducer means and said surface having an average thickness proportional to said parameter; and means coupling said transducer means to said element, isolating the two with respect to oscillatory movement, for maintaining said element said desired fixed distance from said surface.

7. In apparatus including a reference surface, in combination:

transducer means urged toward said reference surface having a surface adjacent said reference surface which it is desired to maintain a fixed average distance from said surface for producing physical oscillatory motions in a direction transverse to the surface for thereby creating a squeezed air film between said transducer means and said surface;

means for producing an error signal indicative of the departure of said transducer means from said surface from said desired fixed average distance, said transducer means being responsive to said signals for producing oscillations of amplitude proportional to a parameter of said signal for creating said air film to maintain said desired distance.